Patented Oct. 4, 1949

2,483,871

UNITED STATES PATENT OFFICE 2,483,871

PROCESS FOR OBTAINING CHLOROAMPHENICOL

Quentin R. Bartz, Detroit, Mich., assignor to Parke, Davis & Company, Detroit, Mich., a corporation of Michigan No Drawing. Application March 16, 1948, Serial No. 15,265

8 Claims. (Cl. 260—562)

This invention relates to the preparation of a new chemical compound, (l)-ψ-1-p-nitrophenyl-2-dichloroacetamidopropane-1,3-diol, which has been given the name, chloramphenicol. This compound is useful as a therapeutic agent because of its antibiotic properties.

This application is a continuation-in-part of my copending application Serial No. 771,141 filed August 28, 1947, now abandoned.

Chloramphenicol, (l)-ψ-1-p-nitrophenyl-2-dichloroacetamidopropane-1,3-diol, is claimed as a composition of matter in the copending application of Crooks, Rebstock, Controulis, and Bartz, Serial No. 76,179, filed February 12, 1949, as a continuation-in-part of Serial No. 15,264, filed March 16, 1948. Chloramphenicol may be prepared as a crystalline solid substance either by microbiological methods as herein described or by chemical methods of syntheses from known and readily available chemical compounds.

Chloramphenicol has the empirical formula $C_{11}H_{12}O_5N_2Cl_2$ and a molecular weight of 323.1. It contains, by analysis, 41.0% carbon, 3.74% hydrogen, 8.64% nitrogen and 21.7% chlorine. This compound is obtained in an optically active form which, for the sake of convenience, has been designated as the l or levo form. Its optical rotation, $[\alpha]_D^{25}$, is —25.5° in ethyl acetate and +18° in ethanol. The chemical name of this new compound is (l)-ψ-1-p-nitrophenyl-2-dichloroacetamidopropane-1,3-diol and it has the following structural formula, $$NO_2-C_6H_4-CH(OH)-CH(NH-CO-CHCl_2)-CH_2OH$$

[l]-ψ form

It is a solid and is obtained as colorless needles or elongated plates melting at 150–151° C. (uncorrected). The compound is further characterized by the fact that it exhibits a $\lambda_{max}$ at 278 mμ and a $E_{1cm}^{1\%}$ of 312 (0.1 N HCl) on ultra violet absorption spectrum analysis.

(l)-ψ-1-p-nitrophenyl-2-dichloroacetamidopropane-1,3-diol is soluble in distilled water at room temperature to the extent of about 2.5 mg./cc. It is relatively insoluble in cold 5% sodium bicarbonate but dissolves slowly in 5% sodium hydroxide. It can be recrystallized from water or from organic solvents or solvent mixtures such as methylene dichloride, ethylene dichloride and ether-petroleum ether mixture. It is soluble in a wide variety of organic solvents and may be extracted from aqueous solutions by many of the more water-immiscible organic solvents. For example, it is soluble in and may be extracted from aqueous solutions with cyclohexanone, methyl isobutyl ketone, n-butanol, amyl acetate, ethyl acetate, nitrobenzene, nitromethane and ether. However, this compound is practically insoluble in aromatic and aliphatic hydrocarbons such as benzene, toluene, pentane and petroleum ether.

In contrast to most of the known antibiotic substances, chloramphenicol possesses a remarkable degree of stability to heat, acids and alkalis. For example, it has been found that it may be heated in distilled water at 37° C. for at least a month or at 100° C. for about five hours without any significant loss of its antibiotic activity. Under similar conditions such well-known antibiotics as penicillin, streptothricin and streptomycin are completely inactivated. The compound is stable in aqueous solutions within the pH range of 0.4 to about 10 for at least twenty-four hours at room temperature. Tests have shown it to be much more stable in acidic aqueous solutions than streptomycin; one of the most stable of the known antibiotics. For example, streptomycin is 90% inactivated within twenty-four hours by 1 N hydrochloric acid at room temperature whereas this product, under the same conditions, retains its full antibiotic potency.

The new compound, (l)-ψ-1-p-nitrophenyl-2-dichloroacetamidopropane-1,3-diol, is strongly active bacteriostatically against gram negative bacteria as well as against both the acid fast and non-acid fast types of gram positive bacteria. It is also effective against the micro-organism responsible for typhus fever, i. e. *Richettsia prowazeki*. Some examples of the gram positive bacteria against which it is effective are: *Staphylococcus aureus*, *Streptococcus haemolyticus*, *Bacillus subtilis* and *Mycobacterium tuberculosis*. Among the many gram negative bacteria against which the compound exhibits its bacteriostatic action are such bacteria as *Escherichia coli*, *Salmonella schottmuelleri*, *Klebsiella pneumoniae* and *Shigella paradysenteriae* (Sonne). In general, the bacteriostatic activity of this new antibiotic is similar to that of streptomycin but in some instances, notably in the case of *Shigella paradysenteriae*, it is much more active than streptomycin. It, in general, is more effective against gram negative bacteria than against gram positive bacteria.

The toxicity of chloramphenicol is much less than that of such well-known antibiotics as tyrothricin, actinomycin, clavacin and the like but about the same as that of streptomycin.

The new antibiotic has been found to give therapeutic blood levels when administered by either the parenteral or oral routes. The fact that it exerts its beneficial effect when administered orally is surprising in view of the fact that at the present time penicillin is almost the only antibiotic which gives therapeutic blood levels on oral administration. Even in this case the destruction of the penicillin by the digestive fluids renders it necessary to administer approximately three to four times the intramuscular quantity of penicillin in order to obtain therapeutic blood levels. The antibiotics which are most effective against gram negative bacteria, such as streptomycin, are completely inactive when administered orally due to the fact that they are not absorbed from the intestinal tract. Thus it will be appreciated that this new antibiotic represents the first antibiotic exhibiting a high degree of activity against gram negative bacteria which is therapeutically effective upon oral administration. The usual oral or parenteral dosage of chloramphenicol in the treatment of urinary or gastro-intestinal tract infections is one to ten grams daily depending, of course, upon the type and extent of the infection.

*Microbiological method for preparing (1)-ψ-1-p-nitrophenyl-2-dichloroacetamidopropane-1, 3-diol*

The new antibiotic compound, chloramphenicol, (1)-ψ-1-p-nitrophenyl-2-dichloroacetamidopropane-1, 3-diol, may be prepared from cultures of an Actinomycete called *Streptomyces venezuelae*. This microorganism occurs inter alia in soils and is characterized by branched slender mycelium rarely or not septate, aerial hypae giving rise apparently endogenously to chains of unicellular spores not normally fragmenting as oidia, unbranched sporophores and spore chains. Cultures of this organism may be obtained by mixing cultures of the specific bacteria inhibited by the micro-organism with aqueous agar and adding a soil containing the desired *Streptomyces venezuelae*. After incubating the mixture for one to ten days colonies of the desired Actinomycete and other antagonists appear. The *Streptomyces venezuelae* growths are selected, transferred to a fresh nutrient medium and later isolated as a pure culture in accordance with the conventional procedures.

According to the invention (1)-ψ-1-p-nitrophenyl-2-dichloroacetamidopropane-1,3-diol is produced by inoculating a suitable nutrient medium with *Streptomyces venezuelae* and incubating the mixture under aerobic conditions at about 20 to 40° C. for about two to fifteen days. After removal of the solid material present in the culture mixture, the desired antibiotic is isolated from the culture liquid.

The cultivation of the organism in the aqueous nutrient medium may be carried out in a number of different ways. For example, the micro-organism may be cultivated under aerobic conditions on the surface of the medium or it may be cultivated beneath the surface of the medium, i. e. in the submerged condition, if oxygen is simultaneously supplied.

Briefly stated, the production of this new antibiotic by the surface culture method involves inoculating a shallow layer, usually less than about 2 cm., of a sterile, aqueous nutrient medium with *Streptomyces venezuelae* and incubating the mixture under aerobic conditions at a temperature between about 20 and 40° C., preferably at room temperature (about 25° C.), for a period of about ten to fifteen days. The mycelium is then removed from the liquid containing the desired (1)-ψ-1-p-nitrophenyl-2 - dichloroacetamidopropane-1,3-diol and the product isolated from the culture liquid by the methods hereinafter described.

The preferred method for producing (1)-ψ-1-p - nitrophenyl-2-dichloroacetamidopropane-1,3-diol on a large scale involves the use of submerged or deep cultures of the organism. According to this embodiment of the invention a sterile, aqueous nutrient medium is inoculated with *Streptomyces venezuelae* and incubated with agitation and aeration at a temperature of about 20 to 40° C. preferably in the neighborhood of 25° C. for about two to seven days. Under these conditions the organism develops as numerous more or less discrete particles dispersed throughout the medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermenters equipped with suitable agitation and aeration devices as well as horizontal rotary drum fermenters have been found to be particularly useful in this respect. However, for the preparation of smaller quantities of the antibiotic or of cultures of the micro-organism this submerged culture method may be carried out in small flasks which are either shaken or stirred by suitable mechanical means.

Agitation and aeration of the culture mixture may be accomplished in a number of ways. Agitation may be provided by a propeller, or similar mechanical agitation device, by revolving or shaking the fermenter itself, by various pumping devices, or by the passage of air or other oxygen-containing gases through the medium. Aeration may be effected by injecting air, or other oxygen-containing gases, into the fermentation mixture through open pipes, perforated pipes, porous diffusion media such as carbon sticks, carborundum, sintered glass and the like, or it may be provided by spraying, splashing or spilling the mash into or through an oxygen-containing atmosphere.

A wide variety of nutrient media may be used in the growing stage of the process. However, it has been found that the best results are obtained when an aqueous medium containing an assimilable carbon source and a proteinaceous material is employed. Assimilable carbon source is here understood to include polyhydric alcohols and mono-, di-, and poly-saccharides while the term proteinaceous material includes unmodified protein and protein degradation products, particularly such products as arise from the hydrolysis of proteins. These portein degradation products include proteoses, peptones, polypeptides, peptides and amino acids.

As assimilable carbon sources glycerol, sorbitol, glucose, fructose, sucrose, inulin, dextrins and starches may be mentioned. These carbon sources may be used in purified form or in the form of concentrates such as whey concentrates, liquefied or modified starches, corn steep liquor, molasses, corn syrup, grain mashes and the like. Some of the grain mashes, as well as some whey concentrates, are sufficiently rich in protein that extra proteinaceous adjuncts need not be added to the medium. These latter substances also contain an appreciable quantity of minerals and growth factors which are favorable for the production of the antibiotic. Sugar alcohols, and in particular, glycerol, have been found to be very desirable as constituents of the medium since they appear to provide a portion of the antibiotic in a form readily accessible for reaction and thus increase the amount of the antibiotic which can be obtained from a given medium.

Some examples of the proteinaceous materials which may be used in the nutrient medium are: acid or enzyme hydrolyzed casein, distillers grain slops, distillers solubles, corn or wheat steep liquor, whey or whey concentrates, soybean meal, acid hydrolyzed corn or wheat gluten, peptone, brewer's yeast, offals and synthetic mixtures of amino acids. These proteinaceous materials need not be supplied in purified form as the less pure materials which contain traces of growth factors and considerable quantities of mineral nutrients are suitable for use. A mixture of peptone or amino acids with dried distillers grain slops or distillers solubles is particularly suitable for the proteinaceous material of the medium.

I have found that the isolation of the pure crystalline antibiotic from the culture medium can be accomplished in a number of different ways. However, in general, my preferred process comprises clarifying the crude culture liquid below about pH 10; extracting the solution with an organic solvent having a solvent-water distribution coefficient for the antibiotic over about 9 such as cyclohexanone, butanol, ethyl acetate and methyl isobutyl ketone; removing the organic solvent from the extract; extracting the residue with an organic solvent having a solvent-water distribution coefficient for the antibiotic of between about 1 and 9 such as nitrobenzene, nitromethane, diethyl ether and ethylene dichloride; washing the extract with dilute mineral acid and water or, alternatively, where a solvent such as a lower dialkyl ether (diethyl ether and the like) or ethylene dichloride has been used as the extraction solvent, passing the extract over an aluminum oxide type adsorption column; adding water to the organic solvent extract; evaporating the organic solvent from the mixture; extracting the aqueous solution with an organic fat solvent in which the antibiotic is substantially insoluble such as benzene or petroleum ether; evaporating the aqueous solution to the point of crystallization and recovering the crystalline antibiotic from the solution. When the acid extraction method is used, it is preferable to also extract the organic extract with a dilute alkali such as sodium bicarbonate in order to remove acidic impurities.

A modification of the above process consists in eliminating the first extraction of the clarified culture liquid with an organic solvent and the subsequent evaporation of the solvent from the extract. In this modified process the clarified culture liquid is extracted with an organic solvent having a solvent-water distribution coefficient for the antibiotic of between about 1 and 9 and the remainder of the process carried out as described above.

Another process which can be used to isolate the desired (1)-$\varphi$-1-p-nitrophenyl-2-dichloroacetamidopropane-1,3-diol from the clarified culture liquid involves adsorbing the antibiotic on activated charcoal and eluting it with ether or 80% acetone. The antibiotic is isolated from the eluate by adding water, distilling off the organic solvent, removing any gumlike material which separates and concentrating the aqueous solution to the point of crystallization.

The invention is illustrated by the following examples.

Example 1

A mixture consisting of 180 g. of glycerol, 90 g. of peptone, 90 g. of dried distillers grain slops, 90 g. of sodium chloride and sufficient distilled water to bring the volume to 18 liters is placed in a 30 liter glass stationary vat-type fermenter provided with a stainless steel head and propeller-type agitator. The fermenter also contains vertical baffle plates and, near the bottom, a perforated circular air diffusion ring.

The pH of the nutrient medium is adjusted to about 7.5 with sodium hydroxide solution and the fermenter placed in an autoclave. The fermenter and the medium are sterilized by steam at 120° C. for one hour, the fermenter cooled and then removed from the autoclave. The medium is inoculated with about 900 cc. of a shaken flask culture of Streptomyces venezuelae, prepared by inoculating 100 cc. portions of a sterile nutrient medium, such as that described above, with spores of the fungus and incubating the mixture in 500 cc. Erlenmeyer flasks on a revolving shaking machine for about seventy-two hours at room temperature.

After inoculation, the culture mixture is incubated at 24 to 25.5° C. for sixty-five to seventy hours. During the incubation sterile air is passed through the diffusion ring into the medium at the rate of 0.8 to 1 volume per volume of medium per minute and the agitator rotated at a speed of about 200 R. P. M.

The following table is illustrative of the antibiotic production obtained by the method described above.

| Incubation Period, hours | Micrograms of Antibiotic per cc. of Culture Medium |
| --- | --- |
| 23 | 44 |
| 40 | 106 |
| 47 | 116 |
| 64 | 133 |
| 71 | 132 |

The desired (1)-$\varphi$-1-p-nitrophenyl-2-dichloroacetamidopropane-1,3-diol is isolated from the crude culture mixture or "beer" containing 132 micrograms of the antibiotic per cc. in the following manner:

The crude beer is acidified to pH 2 with dilute hydrochloric acid and then treated with about 1050 g. of an aluminum silicate filter aid. After stirring for one-half hour to an hour about an additional 1050 g. of the filter aid is added and the mixture filtered through an aluminum silicate filter bed. After washing with water, the filter cake is discarded and the clarified beer and washings extracted with one-fourth volume of ethyl acetate. The ethyl acetate layer is removed, the extraction repeated once and the remaining aqueous solution discarded. The combined ethyl acetate extracts are dried over sodium sulfate and then the ethyl acetate distilled off in vacuo keeping the temperature of the residue below about 30° C. The desired antibiotic is extracted from the brown residue with small portions of ether, a total of about 450 cc. being used.

The combined ether extract is poured through a dry aluminum oxide chromatographic column previously adjusted to about pH 4.7. The column used in this step may be relatively short but it should contain about 15 g. of aluminum oxide per 100 cc. of ether extract. After washing the column with about 1250 cc. of ether to remove any remaining antibiotic, the effluent ether solutions are combined and the ether evaporated in vacuo. The residue is extracted repeatedly with a total of about 2200 cc. of distilled water and the insoluble residue discarded. The aqueous extracts are combined, extracted with two one-half volume portions of petroleum ether and the petroleum ether extracts discarded. Alternatively, water can be added to the ether solution obtained after passage over the adsorption column, the ether distilled from the two phase mixture and the residual aqueous solution extracted with petroleum ether. The aqueous layer or extract obtained by either of the foregoing methods is concentrated in vacuo to the point of crystallization, the concentrate cooled and the white crystalline (l)-ψ-1-p-nitrophenyl - 2 - dichloroacetamidopropane-1,3-diol collected. About 1.54 g. of antibiotic melting in the neighborhood of 144–5° C. is obtained at this point.

A further quantity of the desired product can be recovered from the mother liquors by extracting four times with an equal volume of ether, removing the ether in vacuo, extracting the residue repeatedly with boiling methylene dichloride and concentrating the methylene dichloride extracts to the point of crystallization. The methylene dichloride extract is cooled to about 5° C. and the desired (l)-ψ-1-p-nitrophenyl-2-dichloroacetamidopropane - 1,3 - diol collected. About 0.18 g. of product melting at about 145° C. is recovered in this manner.

After one or two recrystallizations of the above materials from methylene dichloride, ethylene dichloride or ether-petroleum ether mixture the pure (l) - ψ - 1 - p-nitrophenyl-2-dichloroacetamidopropane-1,3-diol is obtained in the form of colorless needles or elongated plates melting at 150–151° C. (uncorrected) and having an optical rotation, $[\alpha]_D^{25}$, of —25.5 in ethyl acetate and +18° in ethanol. Analysis of the product has given the following results: C, 41.0%; H, 3.74% N, 8.64% and organic Cl, 21.71%. On ultraviolet absorption spectrum analysis this product exhibits a λmax at 278 mμ and an $E^{1\%}_{1cm}$ of 312 in 0.1 N hydrochloric acid.

It will, of course, be appreciated by those skilled in the art that various modifications may be made in the above described method for cultivating the organism and isolating the pure, crystalline antibiotic from the crude culture liquid. For example, in the isolation procedure other solvents such as amyl acetate cyclohexanone, butanol or methyl isobutyl ketone may be substituted for the ethyl acetate; nitromethane for the ether; and benzene or dichloroethyl ether for the petroleum ether. The ethyl acetate extraction of the clarified beer may be carried out at a pH of about 9 instead of at about pH 2 in which case it is not necessary to pass the subsequently obtained ether solution of the antibiotic over an aluminum oxide absorption column. The ether solution according to this modification, is extracted with dilute acid, water added to the ether layer and the ether evaporated from the mixture. The gum which separates from the solution is removed and the ether-free aqueous solution concentrated to obtain the crystalline antibiotic. Still another method for the isolation of the antibiotic involves adsorbing the antibiotic present in the clarified beer onto activated carbon and eluting it with ether or 80% acetone.

Example 2

A mixture consisting of 144. g. of maltose, 72 g. of distillers solubles, 72 g. of hydrolyzed casein, 72 g. of sodium chloride and sufficient tap water to bring the volume of 14,400 cc. is adjusted to pH 7.5–7.7 with 10 N sodium hydroxide solution and dispensed in 300 cc. portions into forty-eight wide-mouth 1-liter Erlenmeyer flasks. The flasks are capped with two layers of gauze-cotton milk filter discs and the caps secured in place with spring clips. The flasks are placed in an autoclave and sterilized at 121° C. for 20 minutes. After cooling, the flasks are opened and seeded with 5 cc. per flask of a three-day old shaker flask culture of Streptomyces venezuelae. The inoculated flasks are capped and then incubated for three days at 22 to 24° C. on a rotary type shaking machine (150 R. P. M.; radius of circle, 2 inches).

12 liters of the culture (pH 7.39) which contains a total of 600 mg. of the desired antibiotic is acidified to pH 2 by the addition of 190 cc. of 3 N hydrochloric acid. 304 g. of an aluminum silicate filter aid is added and the suspension stirred for 30 to 60 minutes. An additional 304 g. of filter aid is added and the mixture filtered through a 50 g. pad of aluminum silicate. The filter cake is washed with 1212 cc. of distilled water and discarded. The combined filtrate and washings is extracted by stirring for 10 minutes with one-fourth volume of ethyl acetate. The ethyl acetate layer is removed and the extraction repeated once. The aqueous layer is discarded and the combined ethyl acetate extracts dried over 50 g. of anhydrous sodium sulfate at 5° C.

The sodium sulfate is removed by filtration and the ethyl acetate distilled off in vacuo at a bath temperature of 30° C. The brown residue is extracted with small portions of diethyl ether, a total of 300 cc. being used. The ether extract contains 504 mg. or 84% of the antibiotic present in the culture.

The ether extract is divided into three portions and each poured through a 15 g. column (6.5" x 0.75") of aluminum oxide which has previously been adjusted to pH 4.7 with hydrochloric acid. 120 cc. of diethyl ether, in 20 cc. portions is percolated through each column. The receivers under the columns are changed in order to collect a total of five fractions from each column. The combined first fractions contain 418 mg. of the antibiotic, the second, 65 mg. and the remaining fractions 17 mg.

The first and second fractions from the columns are combined and the ether distilled off in vacuo. The brown residue is extracted repeatedly with distilled water, a total of 625 cc. being used. The combined aqueous extracts are shaken with one-half volume of petroleum ether and the extraction repeated once. The petroleum ether extracts are discarded and the aqueous phase concentrated in vacuo at a bath temperature of 30° C. to the point of crystallization (about 20 cc. ). The solution is cooled overnight at 5° C., the crystals collected, washed with a small amount of cold water and dried over calcium chloride in vacuo; M. P. 144.5–145° C.;

$[\alpha]_D^{25} = -25.5$ in ethyle acetate.

Further quantities of the desired (l)-ψ-1-p-nitrophenyl-2 - dichloroacetamidopropane - 1,3 - diol can be recovered from the mother liquors as described in Example 1. The crystalline product obtained as described above may be purified further, if desired, by recrystallization from methylene or ethylene dichloride; M. P. 150–151° C.

What I claim as my invention is:

1. In a process for obtaining (1)-ψ-1-p-nitrophenyl-2 - dichloroacetamidopropane - 1,3 - diol, the method of isolating said diol from culture liquids containing the same which comprises extracting said culture liquid below about pH 10 with an organic solvent having a solvent-water distribution coefficient for the diol of over about 9, removing the organic solvent from the extract, extracting the residue with an organic solvent having a solvent-water distribution coefficient for the diol between about 1 and 9, washing the extract with dilute mineral acid, adding water to the organic extract and evaporating off the organic solvent, extracting the aqueous solution with an organic fat solvent in which the diol is substantially insoluble, evaporating the aqueous phase to the point of crystallization and recovering the diol from the concentrate.

2. In a process for obtaining (1)-ψ-1-p-nitrophenyl-2 - dichloroacetamidopropane - 1,3 - diol, the method of isolating said diol from culture liquids containing the same which comprises extracting said culture liquid below about pH 10 with ethyl acetate, removing the ethyl acetate from the extract, extracting the residue with diethyl ether, washing the extract with dilute mineral acid, adding water to the ether extract and evaporating off the ether, extracting the aqueous solution with petroleum ether, evaporating the aqueous phase to the point of crystallization and recovering the diol from the concentrate.

3. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with an organic solvent having a solvent-water distribution coefficient for the diol of over about 9, removing the organic solvent from the extract, extracting the residue with an organic solvent of the class consisting of lower dialkyl ethers and ethylene dichloride, passing the extract over an aluminum oxide type adsorption column, adding water to the effluent and evaporating off the organic solvent, extracting the aqueous solution with an organic fat solvent in which the antibiotic is substantially insoluble, evaporating the aqueous phase to the point of crystallization and recovering the diol from the concentrate.

4. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with ethyl acetate, removing the organic solvent from the extract, extracting the residue with ether, passing the extract over an aluminum oxide type adsorption column, adding water to the effluent and evaporating off the ether, extracting the aqueous solution with petroleum ether, evaporating the aqueous phase to the point of crystallization and recovering the diol from the concentrate.

5. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with an organic solvent having a solvent-water distribution coefficient for the diol between about 1 and 9, washing said extract with dilute mineral acid, adding water to the organic extract and evaporating off the organic solvent, extracting the aqueous solution with an organic solvent in which the diol is substantially insoluble, evaporating the aqueous phase to the point of crystallization and recovering the diol from the concentrate.

6. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with diethyl ether, washing said extract with dilute mineral acid, adding water to the ether extract and evaporating off the ether, extracting the aqueous solution with petroleum ether, evaporating the aqueous phase to the point of crystallization and recovering the diol from the concentrate.

7. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with an organic solvent of the class consisting of lower dialkyl ethers and ethylene dichloride, passing the extract over an aluminum oxide type adsorption column, adding water to the effluent and evaporating off the organic solvent, extracting the aqueous solution with an organic fat solvent in which the antibiotic is substantially insoluble, evaporating the aqueous phase to the point of crystallization and recovering the diol from the concentrate.

8. In a process for obtaining (l)-ψ-1-p-nitrophenyl-2-dichloroacetamidopropane-1,3-diol, the method of isolating said diol from culture liquids containing the same which comprises extracting said culture liquid below about pH 10 with diethyl ether, passing the extract over an aluminum oxide type adsorption column, adding water to the effluent and evaporating off the ether, extracting the aqueous solution with petroleum ether, evaporating the aqueous phase to the point of crystallization and recovering the diol from the concentrate.

QUENTIN R. BARTZ.

REFERENCES CITED

The following references are of record in the file of this patent:

UNITED STATES PATENTS

| Number | Name | Date |
| --- | --- | --- |
| 1,865,880 | Oberlin | July 5, 1932 |
| 2,103,266 | Lott | Dec. 28, 1937 |